US012145335B2

(12) United States Patent
Lee et al.

(10) Patent No.: US 12,145,335 B2
(45) Date of Patent: Nov. 19, 2024

(54) PRODUCTION METHOD OF OPTICAL FILM

(71) Applicant: Shanjin Optoelectronics (Suzhou) Co., Ltd., Jiangsu (CN)

(72) Inventors: Hyun Soo Lee, Daejeon (KR); Gae Sung Kim, Daejeon (KR); Young Gon Kim, Daejeon (KR); Tae Woo Kim, Daejeon (KR); Young Tae Kim, Daejeon (KR); Jin Yong Park, Daejeon (KR); Sang Hyun Nah, Daejeon (KR)

(73) Assignee: Shanjin Optoelectronics (NANJING) Co., Ltd. (CN)

( * ) Notice: Subject to any disclaimer, the term of this patent is extended or adjusted under 35 U.S.C. 154(b) by 759 days.

(21) Appl. No.: 17/287,415

(22) PCT Filed: Jan. 10, 2020

(86) PCT No.: PCT/KR2020/000452
§ 371 (c)(1),
(2) Date: Apr. 21, 2021

(87) PCT Pub. No.: WO2020/145714
PCT Pub. Date: Jul. 16, 2020

(65) Prior Publication Data
US 2021/0364685 A1    Nov. 25, 2021

(30) Foreign Application Priority Data

Jan. 11, 2019   (KR) .................. 10-2019-0003684

(51) Int. Cl.
| | |
|---|---|
| *B29D 11/00* | (2006.01) |
| *B29C 71/02* | (2006.01) |
| *B29D 7/01* | (2006.01) |
| *C08J 5/12* | (2006.01) |
| *C08J 5/18* | (2006.01) |
| *C08J 7/04* | (2020.01) |
| *G02B 5/30* | (2006.01) |

(52) U.S. Cl.
CPC ............ *B29D 11/0073* (2013.01); *B29D 7/01* (2013.01); *B29D 11/00788* (2013.01); *C08J 5/124* (2013.01); *C08J 5/18* (2013.01); *C08J 7/0427* (2020.01); *C08J 7/08* (2013.01); *G02B 5/3041* (2013.01); *B32B 2307/42* (2013.01); *B32B 2307/736* (2013.01); *C08J 2329/04* (2013.01); *C08J 2367/02* (2013.01); *C08J 2463/00* (2013.01); *C08J 2475/14* (2013.01)

(58) Field of Classification Search
CPC ......... B29D 11/0073; B29D 11/00788; B29D 7/01; G02B 5/3041; C08J 7/0427; C08J 7/08; C08J 5/124; C08J 5/18
See application file for complete search history.

(56) References Cited

U.S. PATENT DOCUMENTS

| | | | |
|---|---|---|---|
| 2006/0045982 A1 | 3/2006 | Matsumoto et al. | |
| 2009/0136738 A1* | 5/2009 | Kondo | ................. C09D 133/06 428/323 |
| 2015/0146293 A1 | 5/2015 | Sasaki | |
| 2016/0297938 A1 | 10/2016 | Shiraishi et al. | |

FOREIGN PATENT DOCUMENTS

| | | |
|---|---|---|
| JP | 2003207620 A | 7/2003 |
| JP | 2004-351327 A | 12/2004 |
| JP | 2007052204 A | 3/2007 |
| JP | 2007-197611 A | 8/2007 |
| JP | 2010-143213 A | 7/2010 |
| JP | 2012-032819 A | 2/2012 |
| JP | 5652211 B | 8/2012 |
| JP | 2012145679 A | 8/2012 |
| KR | 10-2009-0024101 A | 3/2009 |
| KR | 1020160113595 A | 9/2016 |

OTHER PUBLICATIONS

Notification of Reasons for Rejection by JPO, dated Jan. 4, 2023, whole translation.
1OA by China National IPA, dated Jul. 19, 2022, whole translation.
EPC, Art. 94(3) Communication, Feb. 22, 2024, EP20738660.8.

* cited by examiner

*Primary Examiner* — Mathieu D Vargot

(57) ABSTRACT

The present application relates to an optical film and a method for producing a polarizing plate. The present application can provide an optical film satisfying optical and mechanical durability required in a polarizing plate effectively and capable of forming a polarizing plate without causing bending when applied to a display device, and a method for producing a polarizing plate to which the optical film is applied. The present application can provide an optical film capable of realizing the required optical and mechanical durability without causing bending even in a polarizing plate applied to a thin display device and/or a thin polarizing plate, and a method for producing a polarizing plate to which the optical film is applied.

16 Claims, No Drawings

PRODUCTION METHOD OF OPTICAL FILM

CROSS-REFERENCE TO RELATED APPLICATION

This application is a National Stage Application of International Application No. PCT/KR2020/000452 filed Jan. 10, 2020, and claims priority to Korean Patent Application No. 10-2019-0003684 filed on Jan. 11, 2019, the disclosures of which are incorporated herein by reference in their entireties.

TECHNICAL FIELD

The present application relates to a method for producing an optical film or a polarizing plate.

BACKGROUND ART

Polarizing plates are optical films applied to control light states in various display devices. Usually, the polarizing plate is produced by attaching a protective film to one side or both sides of a polarizing film with a polarizing function.

Since the polarizing plate is exposed to various temperature and humidity conditions depending on the use environment of the display device, it requires durability. For example, the polarizing plate should stably maintain the designed optical properties according to the external environment such as temperature and humidity, and should not cause mechanical defects such as cracks.

The protective film of the polarizing film should be selected so that the polarizing plate can satisfy the required physical properties as above.

Recently, as the demand for thinner display devices increases, there is also a demand for thin polarizing plates that do not cause bending. Since the polarizing film or other components included in the polarizing plate are usually produced through a stretching process, they tend to generate stress depending on external temperature and humidity. Such stress can cause bending in thin display devices, and such bending can adversely affect the performance of the display devices.

DISCLOSURE

Technical Problem

The present application relates to an optical film and a method for producing a polarizing plate. It is an object of the present application to provide an optical film effectively satisfying optical and mechanical durability required in the polarizing plate and capable of forming a polarizing plate without causing bending when applied to a display device, and a method for producing a polarizing plate applying the optical film.

It is one object of the present application to provide an optical film capable of realizing the required optical and mechanical durability without causing bending even in a polarizing plate applied in a thin display device and/or a polarizing plate having a thin thickness and a method for producing a polarizing plate applying the optical film.

Technical Solution

In this specification, the term such as vertical, horizontal, orthogonal or parallel among terms defining an angle means substantially vertical, horizontal, orthogonal or parallel in the range without impairing intended effects, and the range of vertical, horizontal, orthogonal or parallel includes an error such as a production error or a deviation (variation). For example, each case of the foregoing may include an error within about ±15 degrees, an error within about ±10 degrees or an error within about ±5 degrees.

Among physical properties referred to herein, when the measured temperature affects relevant physical properties, the physical properties are physical properties measured at room temperature, unless otherwise specified.

In this specification, the term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

Among physical properties referred to herein, when the measured pressure affects relevant physical properties, the physical properties are physical properties measured at normal pressure, unless otherwise specified. In this specification, the term normal pressure is a natural pressure without particularly pressurizing or depressurizing, which usually means a pressure of about 1 atm or so, such as atmospheric pressure.

Among physical properties referred to herein, when the measured humidity affects relevant physical properties, the physical properties are physical properties measured at any one humidity in a range of about 0 RH % to 100 RH %, for example, relative humidity of about 90 RH % or less, about 80 RH % or less, about 70 RH % or less, about 60 RH % or less, about 50 RH % or less, about 40 RH % or less, about 30 RH % or less, about 20 RH % or less, about 18 RH % or less, about 15 RH % or less, or about 10 RH % or less, or about 1 RH % or more, about 2 RH % or more, about 5 RH % or more, about 10 RH % or more, about 15 RH % or more, about 20 RH % or more, about 25 RH % or more, about 30 RH % or more, about 35 RH % or more, about 40 RH % or more, or about 45 RH % or more, unless otherwise specified. Here, the unit RH % means that the relevant humidity is the relative humidity (unit: %).

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

The method for producing an optical film of the present application may comprise a step of heat-treating a polymer film having an optical layer formed on its surface.

The optical film produced in the method of the present application may be a film that exhibits one or more optically intended functions, and may be, for example, a protective film of a polarizing film.

In the present application, it has been confirmed that a polymer film is heat-treated in a state where an optical layer is formed on its surface, whereby the secured properties of the polymer film greatly contribute to producing the desired polarizing plate. Such heat-treatment is particularly effective for polymer films having mechanical anisotropy, as described below. The optical layer may be formed only on one surface of the polymer film. That is, the heat-treatment of the polymer film may be performed in a state where the optical layer is formed asymmetrically on the polymer film.

Here, the kind of the optical layer formed on the surface of the polymer film is not particularly limited. The optical layer may be, for example, a layer comprising a so-called hard coating layer, an antireflection layer or an antiglare layer, or an antistatic layer, and the like, or may be an optical layer that two or more functions are compounded among the functions represented by the above-mentioned layers.

The hard coat layer is usually formed for the purpose of preventing scratches on the surface of the polarizing plate or the optical film. The antireflection layer is usually performed for the purpose of preventing the reflection of external light on the surface of the polarizing plate or the optical film, and the antiglare layer is a layer formed for the purpose of preventing visibility from deteriorating due to external light reflection on the surface of the polarizing plate or the optical film. In addition, the antistatic layer is usually a layer formed to prevent the phenomenon that the optical film is unnecessary or excessively charged by adjusting the electrical resistance of the optical film to an appropriate level.

The material of the above-mentioned optical layer and a method of forming the same are well known in the industry of optical films such as polarizing plates, and such known materials and methods may be applied in the present application.

Typically, the above-mentioned optical layers comprise a photocurable binder, and thus the optical layers applied in the present application also comprise a photocurable binder. Here, the photocurable binder means a binder formed by curing or polymerizing a photocurable or photopolymerizable compound. Here, in the category of light that induces curing or polymerization of the photocurable or photopolymerizable compound, particle beams such as alpha-particle beams, proton beams, neutron beams or electron beams, and the like, as well as microwaves, infrared rays (IR), ultraviolet rays (UV), X-rays and gamma rays, may also be included. Usually, an ultraviolet-ray or electron-beam curing or polymerizable compound is used as the binder of the optical layer.

As typical photocurable or photopolymerizable compounds, acrylic compounds may be exemplified.

For example, the optical layer may be formed by coating a coating composition containing the acrylic compound as the binder and crosslinking or polymerizing the compound. Therefore, the optical layer may be a crosslinked layer or a cured layer of the curable composition comprising a crosslinked product or a cured product of the acrylic compound as the binder.

A non-limiting example of the applicable acrylic compound includes a (meth)acrylic acid diester such as neopentyl glycol diacrylate, 1,6-hexanediol di(meth)acrylate or propylene glycol di(meth)acrylate; a (meth)acrylic acid diester of a polyoxyalkylene glycol such as triethylene glycol di(meth)acrylate, dipropylene glycol di(meth)acrylate, polyethylene glycol di(meth)acrylate or polypropylene glycol di(meth) acrylate; a (meth)acrylic acid diester of a polyhydric alcohol such as pentaerythritol di(meth)acrylate; a compound such as epoxy (meth)acrylate, urethane (meth) acrylate or polyester (meth)acrylate, or a multifunctional compound having 3 or more (meth)acryloyl groups such as trimethylolpropane tri(meth)acrylate, trimethylolethane tri (meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate or tripentaerythritol hexatriacrylate, and the like.

The optical layer or the curable composition for forming the optical layer may further comprise any additive for securing a necessary function in addition to the binder. For example, the optical layer or the curable composition may comprise an initiator or a catalyst for initiating or accelerating curing or crosslinking of the acrylic compound, high refractive or low refractive particles for controlling the refractive index of the relevant optical layer, or any additive such as a surfactant or a leveling agents, and the kind thereof is not particularly limited.

The method for producing the optical film may comprise a step of steam-treating the polymer film before the heat-treatment; and a step of forming the optical layer on the surface of the steam-treated polymer film.

The steam treatment step is a step of exposing the polymer film to steam, where the flatness of the polymer film can be improved by this step. After the optical layer is formed on the surface of the polymer film having improved flatness, the above-described heat-treatment may be performed to more effectively secure the desired characteristics.

The manner of performing the steam treatment is not particularly limited. For example, it may be performed in a manner of positioning the polymer film on a flat surface, positioning the polymer film in the direction parallel to the gravity direction, or positioning the polymer film at another position where the flatness may be secured and then exposing all or part of the polymer film to steam.

The steam treatment may be performed by applying steam having an appropriate range of temperature as the steam applied to the treatment in consideration of the glass transition temperature of the polymer film. In one example, the temperature of the steam applied at the time of the steam treatment may be in a range of 50° C. to 150° C. In another example, the steam temperature may be about 55° C. or higher, about 60° C. or higher, about 65° C. or higher, about 70° C. or higher, about 75° C. or higher, or about 80° C. or higher, or may also be about 145° C. or lower, about 140° C. or lower, about 135° C. or lower, about 130° C. or lower, about 125° C. or lower, about 120° C. or lower, about 115° C. or lower, about 110° C. or lower, about 105° C. or lower, or about 100° C. or lower.

The time for performing the steam treatment may be set within a range in which the desired flatness of the polymer film may be secured, and the specific range may be changed by the state of the polymer film, the temperature of steam, and the like. Typically, the steam treatment may be performed for 10 seconds to 1 hour. In another example, the steam treatment time may be about 55 minutes or less, about 50 minutes or less, about 45 minutes or less, about 40 minutes or less, about 35 minutes or less, about 30 minutes or less, about 25 minutes or less, about 20 minutes or less, about 15 minutes or less, about 10 minutes or less, about 5 minutes or less, or about 1 minute or less, or may also be about 20 seconds or more or so.

The manner of forming the optical layer after the steam treatment is not particularly limited, where the optical layer may be formed according to a known manner of forming the optical layer. For example, the optical layer may be formed in a manner of coating a curable composition prepared by using the acrylic compound as the above-described binder and other necessary additives on one side of the polymer film, and then crosslinking or polymerizing the acrylic compound.

The polymer film in which the heat-treatment is performed may be a film having a mechanically specific asymmetry property. By applying such a film to the heat-treatment process, the object can be effectively achieved.

The physical properties of the polymer film referred to herein are each measured according to the methods described in the example section of this specification.

The term first direction and second direction of the polymer film used in this specification is any in-plane direction of the polymer film. For example, when the polymer film is a stretched polymer film, the in-plane direction may be an in-plane direction formed by MD (machine direction) and TD (transverse direction) directions of the polymer film. In another example, the first direction may be any one of MD (machine direction) and TD (transverse direction) directions when the polymer film is a stretched polymer film, and the second direction may be the other of MD (machine direction) and TD (transverse direction) directions.

In one example, the first direction of the polymer film referred to herein may be the TD direction.

The asymmetry property of the polymer film may be represented by shrinkage force of the polymer film. The shrinkage force (shrinkage force of optical film, polymer film, polarizing film or polarizing plate) referred to herein is measured in the manner described in the following examples. In addition, the shrinkage force may be measured in a state of the polymer film alone or where the optical layer is formed on the polymer film.

In one example, the polymer film may have shrinkage force in the first direction (for example, the above-described TD direction) before the heat-treatment in a range of 5.5N to 15N. In another example, the shrinkage force of the polymer film in the first direction may be about 6N or more, about 6.5 N or more, about 7 N or more, or about 7.5 N or more, or may be about 15 N or less, 14 N or less, 13 N or less, 12 N or less, 11 N or less, 10 N or less, 9 N or less, or 8 N or less. This high shrinkage force in one direction allows the desired optical film to be effectively formed after the heat-treatment process.

In the polymer film, a ratio (S1/S2) of shrinkage force (S1) in the first direction and shrinkage force (S2) in an in-plane second direction perpendicular to the first direction before heat-treatment may be 10 or more. In another example, the ratio (S1/S2) may be about 11 or more, about 12 or more, about 13 or more, about 14 or more, about 15 or more, or about 15.5 or more, or may be about 150 or less, about 140 or less, about 130 or less, about 120 or less, about 110 or less, about 100 or less, about 90 or less, or about 80 or less or so. Here, in one example, the in-plane second direction may be the MD direction.

The polymer film may have shrinkage force in the second direction (for example, the above-described MD direction) in a range of 0.01N to 2N before the heat-treatment. In another example, the shrinkage force of the polymer film in the second direction may be about 0.03N or more, about 0.05N or more, about 0.07 N or more, or about 0.09 N or more, or may be about 1.8 N or less, 1.6 N or less, 1.4 N or less, 1.2 N or less, 1 N or less, 0.8 N or less, or 0.6 N or less or so. This high shrinkage force in one direction allows the desired optical film to be effectively formed after the heat-treatment process.

As the polymer film having relatively high shrinkage force and/or an asymmetry property of shrinkage force as above, a film known as a so-called high-stretched PET (poly(ethylene terephthalate)) film or SRF (super retardation film) exhibiting a high phase difference of approximately 3,000 nm or more, and the like, is representatively known. Therefore, in the present application, the polymer film may be, for example, a polyester polymer film. Such a film itself is known in the industry, and this film exhibits a large asymmetry property of mechanical physical properties by high stretching or the like during the production process. A representative example of the polymer film in a state known in the industry is a polyester film such as a PET (poly(ethylene terephthalate)) film, and for example, there is a film of the trade name SRF (super retardation film) series supplied by Toyobo.

Usually, the stretched PET film is a uniaxially stretched film with one or more layers produced by melting/extruding a PET-based resin to form a film and stretching it or a biaxially stretched film with one or more layers produced by longitudinal and transverse stretching it after film formation.

The PET-based resin generally means a resin in which 80 mol % or more of repeating units become ethylene terephthalate, which may also comprise other dicarboxylic acid components and diol components. The other dicarboxylic acid component is not particularly limited, but it may include, for example, isophthalic acid, p-beta-oxyethoxy benzoic acid, 4,4'-dicarboxydiphenyl, 4,4'-dicarboxybenzophenone, bis(4-carboxyphenyl)ethane, adipic acid, sebacic acid and/or 1,4-dicarboxycyclohexane, and the like.

The other diol component is not particularly limited, but it may include propylene glycol, butanediol, neopentyl glycol, diethylene glycol, cyclohexanediol, an ethylene oxide adduct of bisphenol A, polyethylene glycol, polypropylene glycol and/or polytetramethylene glycol, and the like.

The dicarboxylic acid component or the diol component may be used in combination of two or more as needed. Also, it may be used in combination with an oxycarboxylic acid such as p-oxybenzoic acid. In addition, as the other copolymerization component, a diol component, or a dicarboxylic acid component containing a small amount of amide bonds, urethane bonds, ether bonds, carbonate bonds, or the like may also be used.

As a method for preparing a PET-based resin, a method of directly polycondensing terephthalic acid, ethylene glycol and/or other dicarboxylic acids or other diols as necessary, a method of transesterifying a dialkyl ester of terephthalic acid and ethylene glycol and/or other dialkyl esters of dicarboxylic acids or other diols as necessary, followed by polycondensation, a method of polycondensing terephthalic acid and/or other ethylene glycol esters of dicarboxylic acids as necessary and/or other diol esters as necessary, and the like are adopted.

For each polymerization reaction, a polymerization catalyst comprising an antimony-based, titanium-based, germanium-based or aluminum-based compound, or a polymerization catalyst comprising a composite compound thereof can be used.

The polymerization reaction conditions may be appropriately selected depending on the monomers used, the catalyst, the reaction apparatus, and the desired resin physical properties, which are not particularly limited, but for example, the reaction temperature is usually about 150° C. to about 300° C., about 200° C. to about 300° C. or about 260° C. to about 300° C. In addition, the reaction pressure is usually from atmospheric pressure to about 2.7 Pa, where the pressure may be reduced in the latter half of the reaction.

The polymerization reaction proceeds by volatilizing leaving reactants such as a diol, an alkyl compound or water.

The polymerization apparatus may also be one which is completed by one reaction tank or connects a plurality of reaction tanks. In this case, the reactants are polymerized while being transferred between the reaction tanks, depending on the degree of polymerization. In addition, a method, in which a horizontal reaction apparatus is provided in the latter half of the polymerization and the reactants are volatilized while heating/kneading, may also be adopted.

After completion of the polymerization, the resin is discharged from the reaction tank or the horizontal reaction apparatus in a molten state, and then, obtained in the form of flakes cooled and pulverized in a cooling drum or a cooling belt, or in the form of pellets tailored after being introduced into an extruder and extruded in a string shape. Furthermore, solid-phase polymerization may be performed as needed, thereby improving the molecular weight or decreasing the low molecular weight component. As the low molecular weight component that may be contained in the PET-based resin, a cyclic trimer component may be exemplified, but the content of such a cyclic trimer component in the resin is usually controlled to 5,000 ppm or less, or 3,000 ppm or less.

The molecular weight of the PET-based resin is usually in a range of 0.45 to 1.0 dL/g, 0.50 to 1.0 dL/g or 0.52 to 0.80 dL/g, when the resin has been dissolved in a mixed solvent of phenol/tetrachloroethane=50/50 (weight ratio) and it has been represented as a limiting viscosity measured at 30° C.

The PET-based resin may contain additives as required. The additive may include a lubricant, an anti-blocking agent, a heat stabilizer, an antioxidant, an antistatic agent, a light stabilizer and an impact resistance improver, and the like. The addition amount thereof is preferably within a range that does not adversely affect the optical properties.

The PET-based resin is used in the form of pellets assembled by an ordinary extruder, for formulation of such additives and film molding to be described below. The size and shape of the pellets are not particularly limited, but they are generally a cylindrical, spherical or flat spherical shape having both height and diameter of 5 mm or less. The PET-based resin thus obtained can be molded into a film form and subjected to a stretching treatment to obtain a transparent and homogeneous PET film having high mechanical strength. The production method thereof is not particularly limited, and for example, the following method is adopted.

Pellets made of the dried PET resin are supplied to a melt extrusion apparatus, heated to a melting point or higher and melted. Next, the melted resin is extruded from the die and quenched and solidified on a rotary cooling drum to a temperature below the glass transition temperature to obtain an un-stretched film in a substantially amorphous state. This melting temperature is determined according to the melting point of the PET-based resin to be used or the extruder, which is not particularly limited, but is usually 250° C. to 350° C. In order to improve planarity of the film, it is also preferred to enhance adhesion between the film and the rotary cooling drum, and an adhesion method by electrostatic application or an adhesion method by liquid coating is preferably adopted. The adhesion method by electrostatic application is usually a method in which linear electrodes are provided on the upper surface side of a film in a direction perpendicular to the flow of the film and a direct current voltage of about 5 to 10 kV is applied to the electrodes to provide static charges to the film, thereby improving the adhesion between the rotary cooling drum and the film. In addition, the adhesion method by liquid coating is a method for improving the adhesion between the rotary cooling drum and the film by uniformly coating a liquid to all or a part (for example, only the portion in contact with both film ends) of the surface of the rotary cooling drum. Both of them may also be used in combination if necessary. The PET-based resin to be used may be mixed with two or more resins, or resins having different structures or compositions, if necessary. For example, it may include using a mixture of pellets blended with a particulate filling material as an anti-blocking agent, an ultraviolet absorbing agent or an antistatic agent, and the like, and non-blended pellets, and the like.

The laminating number of films to be extruded may also be two or more layers, if necessary. For example, it may include that pellets blended with a particulate filling material as an anti-blocking agent and non-blended pellets are prepared and supplied from the other extruder to the same die to extrude a film composed of two kinds and three layers, "blended with filling material/non-blended/blended with filling material," and the like.

The un-stretched film is usually stretched longitudinally at a temperature not lower than the glass transition temperature in the extrusion direction first. The stretching temperature is usually 70° C. to 150° C., 80 to 130° C., or 90 to 120° C. In addition, the stretching ratio is usually 1.1 to 6 times or 2 to 5.5 times. The stretching may be terminated once or divided into more than once as necessary.

The longitudinally stretched film thus obtained may be subjected to a heat-treatment thereafter. Then, a relaxation treatment may be performed if necessary. The heat-treatment temperature is usually 150° C. to 250° C., 180 to 245° C. or 200 to 230° C. Also, the heat-treatment time is usually 1 to 600 seconds or 1 to 300 seconds or 1 to 60 seconds.

The temperature of the relaxation treatment is usually 90 to 200° C. or 120 to 180° C. Also, the amount of relaxation is usually 0.1 to 20% or 2 to 5%. The relaxation treatment temperature and the relaxation amount can be set so that a heat shrinkage rate of the PET film after relaxation treatment at 150° C. is 2% or less.

In the case of obtaining uniaxially stretched and biaxially stretched films, transverse stretching is usually performed by a tenter after the longitudinal stretching treatment or after the heat-treatment or relaxation treatment, if necessary. The stretching temperature is usually 70° C. to 150° C., 80° C. to 130° C., or 90° C. to 120° C. In addition, the stretching ratio is usually 1.1 to 6 times or 2 to 5.5 times. Thereafter, the heat-treatment and, if necessary, the relaxation treatment can be performed. The heat-treatment temperature is usually 150° C. to 250° C. or 180° C. to 245° C. or 200 to 230° C. The heat-treatment time is usually 1 to 600 seconds, 1 to 300 seconds, or 1 to 60 seconds.

The temperature of the relaxation treatment is usually 100 to 230° C., 110 to 210° C. or 120 to 180° C. Also, the relaxation amount is usually 0.1 to 20%, 1 to 10%, or 2 to 5%. The relaxation treatment temperature and the relaxation amount can be set so that the heat shrinkage rate of the PET film after the relaxation treatment at 150° C. is 2% or less.

In uniaxial stretching and biaxial stretching treatments, in order to alleviate deformation of the orientation main axis as represented by bowing, the heat-treatment can be performed again or the stretching treatment can be performed after the transverse stretching. The maximum value of deformation in the orientation main axis by bowing with respect to the stretching direction is usually within 45 degrees, within 30 degrees, or within 15 degrees. Here, the stretching direction also refers to a stretching large direction in longitudinal stretching or transverse stretching.

In the biaxial stretching of the PET film, the transverse stretching ratio is usually slightly larger than the longitudinal stretching ratio, where the stretching direction refers to a direction perpendicular to the long direction of the film. Also, the uniaxial stretching is usually stretched in the transverse direction as described above, where the stretching direction equally refers to a direction perpendicular to the long direction.

The orientation main axis refers to a molecular orientation direction at any point on the stretched PET film. Furthermore, the deformation of the orientation main axis with respect to the stretching direction refers to an angle difference between the orientation main axis and the stretching direction. In addition, the maximum value thereof refers to a maximum value of the values on the vertical direction with respect to the long direction. The method of identifying the orientation main axis is known, and for example, it can be measured using a retardation film/optical material inspection apparatus RETS (manufactured by Otsuka Densi KK) or a molecular orientation system MOA (manufactured by Oji Scientific Instruments).

The thickness of the polymer film applied in the present application is determined depending on the use, which is not particularly limited. For example, the thickness of the polymer film may be in a range of about 20 μm to 250 μm. In another example, the thickness may be about 240 μm or less, about 230 μm or less, about 220 μm or less, about 210 μm or less, about 200 μm or less, about 190 μm or less, about 180 μm or less, about 170 μm or less, about 160 μm or less, 150 μm or less, about 140 μm or less, about 130 μm or less, about 120 μm or less, about 110 μm or less, or 100 μm or less, or may be about 30 μm or more, 40 μm or more, 50 μm or more, 60 μm or more, or 70 μm or more or so.

The heat-treatment of the polymer film may be performed such that the ratio (SB/SA) of the shrinkage force (SB) of the polymer film before the heat-treatment in the first direction and the shrinkage force (SA) of the polymer film after the heat-treatment may exceed approximately 1. In another example, the ratio (SB/SA) may be about 1.01 or more, about 1.02 or more, about 1.03 or more, 1.04 or more, about 1.05 or more, about 1.06 or more, about 1.07 or more, about 1.08 or more, about 1.09 or more, about 1.1 or more, about 1.11 or more, about 1.12 or more, about 1.13 or more, 1.14 or more, about 1.15 or more, about 1.16 or more, about 1.17 or more, about 1.18 or more, about 1.19 or more, about 1.2 or more, about 1.21 or more, about 1.22 or more, or about 1.23 or more, or may also be about 10 or less, about 9 or less, about 8 or less, about 7 or less, about 6 or less, about 5 or less, about 4 or less, about 3 or less, about 2 or less, about 1.9 or less, about 1.8 or less, about 1.7 or less, about 1.6 or less, about 1.5 or less, about 1.4 or less, or about 1.3 or less or so. The overall physical properties of the polymer film may be maintained at a desired level by the heat-treatment performed so that the shrinkage force of the polymer film in the first direction is corrected within the range.

The polymer film may have shrinkage force in the first direction after heat-treatment within a range of approximately 5 to 10N. In another example, the shrinkage force in the first direction after the heat-treatment may be about 5.1N or more, about 5.2N or more, about 5.3N or more, about 5.4N or more, about 5.5N or more, 5.6N or more, 5.7N or more, 5.8N or more, 5.9N or more, 6N or more, 6.1N or more, 6.2N or more, 6.3N or more, 6.4N or more, 6.5N or more, 6.6N or more, 6.7N or more, 6.8N or more, 6.9N or more, about 7N or more, or about 7.1 or more, or may be about 9.5N or less, about 9N or less, about 8.5N or less, about 8 or less, about 7.5N or less, 7.3N or less, 7.2N or less, 7.1N or less, 7.0N or less, or 6.9N or less. The overall physical properties of the polymer film may be maintained at a desired level by the heat-treatment performed so that the shrinkage force of the polymer film in the first direction is corrected within the range.

The polymer film may have a ratio (S1/S2) of the shrinkage force (S1) in the first direction (for example, the TD direction) and the shrinkage force (S2) in the in-plane second direction (for example, the MD direction) perpendicular to the first direction after the heat-treatment of 13 or more. In another example, the ratio (S1/S2) may be about 14 or more, about 15 or more, about 16 or more, about 17 or more, or about 17.5 or more, or may be about 150 or less, about 140 or less, about 130 or less, about 120 or less, about 110 or less, about 100 or less, about 90 or less or about 80 or less, about 70 or less, about 60 or less, about 50 or less, about 40 or less, or about 38 or less or so. The overall physical properties of the polymer film may be maintained at a desired level by the heat-treatment performed so that the shrinkage force of the polymer film is corrected within the range.

The polymer film may have shrinkage force in the second direction (for example, the above-described MD direction) after the heat-treatment in a range of 0.05N to 3N. In another example, the shrinkage force of the polymer film in the second direction may be about 0.07N or more, about 0.09N or more, about 0.1N or more, about 0.15N or more or about 0.2N or more, or may be about 1.8N or less, 1.6N or less, 1.4 N or less, 1.2 N or less, 1 N or less, 0.8 N or less, 0.6 N or less, or about 0.4 N or less or so. The overall physical properties of the polymer film may be maintained at a desired level by heat-treatment performed so that the shrinkage force of the polymer film is corrected within the range.

In general, when the heat-treatment temperature is high or the heat-treatment time is long, the shrinkage force tends to be reduced, so that the heat-treatment conditions can be appropriately adjusted in consideration of this.

The above-described high-stretched polyester film exhibits an asymmetry property, as described above, but it is not easy to achieve the desired shrinkage force characteristics in the present application by itself. Therefore, in the present application, a predetermined heat-treatment is performed on the high-stretched polyester film to adjust the characteristics. For example, the shrinkage force of the polymer film may be reduced through heat-treatment at a predetermined range of temperature based on the glass transition temperature (Tg) of the relevant film. For example, when the glass transition temperature of the relevant protective film is set as Tg (unit: ° C.), the heat-treatment is performed at a temperature within the range of Tg−60 (° C.) to Tg+50 (° C.), whereby the shrinkage force or the like can be adjusted to the desired range. In this case, generally, the shrinkage force is controlled in the TD (transverse direction) direction rather than the so-called MD (machine direction) direction.

In another example, the heat-treatment temperature may be Tg+45° C. or less, Tg+40° C. or less, Tg+35° C. or less, Tg+30° C. or less, Tg+25° C. or less, Tg+20° C. or less, Tg+15° C. or less, Tg+10° C. or less, Tg+5° C. or less, Tg° C. or less, Tg−5° C. or less, Tg−10° C. or less, Tg−15° C. or less, Tg−20° C. or less, Tg−25° C. or less, Tg−30° C. or less, or Tg−35° C. or less or so, or may be Tg−55° C. or more, Tg−50° C. or more, Tg−45° C. or more, or Tg−40° C. or more, wherein Tg is the glass transition temperature.

In the present application, it has been confirmed that the desired characteristics can be secured by performing heat-treatment at such a temperature on the highly stretched polyester film. Considering the desired characteristics, the time for which the heat-treatment is performed can be adjusted without particular limitation, and it may be generally performed within the range of about 10 seconds to 1,000 seconds. In another example, the heat-treatment time may be about 15 seconds or more, about 20 seconds or more, about 25 seconds or more, or about 30 seconds or more, or may also be about 900 seconds or less, about 850 seconds or less, about 800 seconds or less, about 750 seconds or less, about 700 Seconds or less, about 650 seconds or less, about 600 seconds or less, about 550 seconds or less, about 500 seconds or less, about 450 seconds or less, about 400 seconds or less, about 350 seconds or less, about 300 seconds or less, about 250 seconds or less, about 200 seconds or less, about 150 seconds or less, about 100 seconds or less, or about 90 seconds or less or so.

The optical film may be formed by correcting the asymmetry property of the polymer film to a desired level through the heat-treatment as above.

The present application also relates to a method for producing a polarizing plate using the optical film produced in the same manner as above.

In this specification, the terms polarizing film and polarizing plate have different meanings. The term polarizing film means a functional element itself exhibiting a polarizing function, such as, for example, a PVA (poly(vinyl alcohol))-based film in which an anisotropic substance such as iodine is adsorbed and oriented, and the polarizing plate means an element comprising other elements together with the polarizing film. Here, other elements included together with the polarizing film can be exemplified by a polarizing film protective film, a viewing angle compensating film, a hard coating layer, a phase difference film, an adhesive layer, a pressure-sensitive adhesive layer, an antistatic layer or a low reflection layer, and the like, but is not limited thereto.

The optical film produced by the method of the present application may be another element included in the polarizing plate together with the polarizing film, and in one example, the optical film may be applied as the protective film of the polarizing film.

The polarizing plate produced in the present application may have a total thickness of 200 μm or less. That is, the polarizing plate may comprise various elements as described above, but the final thickness may be limited within the range. When the thickness of the polarizing plate is set as 200 μm or less, it can cope effectively with various applications for which the thin thickness is required. Usually, on a polarizing plate, a pressure-sensitive adhesive layer for applying the polarizing plate to a display device is formed, and in order to protect the pressure-sensitive adhesive layer, optionally, a release film is attached to the pressure-sensitive adhesive layer or a release surface-protective sheet is temporarily attached to the outermost side of the polarizing plate. The thickness of 200 μm or less mentioned in the present application is a thickness excluding portions finally removed when the polarizing plate is applied to a display, such as the release film or the surface-protective sheet. In another example, the thickness may be about 195 μm or less, about 190 μm or less, about 185 μm or less, about 180 μm or less, about 175 μm or less, about 170 μm or less, about 165 μm or less, about 160 μm or less, about 155 μm or less, about 150 μm or less, about 145 μm or less, or about 140 μm or less or so. The lower limit of the thickness of the polarizing plate is not particularly limited, but it may generally be about 50 μm or more, 60 μm or more, 70 μm or more, 80 μm or more, 90 μm or more, 100 μm or more, 110 μm or more, or 120 μm or more or so.

The thickness referred to herein may mean the shortest distance, the maximum distance or the average distance connecting the major surface of the target article to the main back, where there may also be manufacturing errors or deviations of a certain portion.

The polarizing plate may basically comprise a polarizing film and the optical film, wherein the optical film may be included as the protective film of the polarizing film. In addition, the polarizing plate may comprise a pressure-sensitive adhesive layer. Such a pressure-sensitive adhesive layer may be a pressure-sensitive adhesive layer for attaching the polarizing plate to a display device. When the pressure-sensitive adhesive layer is included, the components of the polarizing plate may be arranged in the order of the optical film, the polarizing film, and the pressure-sensitive adhesive layer.

Therefore, the production method may comprise a step of attaching the polarizing film and the optical film produced by the method. In addition, the production method of the polarizing plate may also further comprise a step of forming a pressure-sensitive adhesive layer on the surface of the side opposite to the surface of the polarizing film to which the optical film is attached.

The pressure-sensitive adhesive layer may be present for attaching the polarizing plate to a display device such as an LCD or an OLED. The pressure-sensitive adhesive for forming the pressure-sensitive adhesive layer is not particularly limited, and for example, an acrylic polymer, a silicone-based polymer, polyester, polyurethane, polyamide, polyether or a polymer such as a fluorine series or a rubber series as a base polymer can be appropriately selected and used. As described above, with respect to the exposed surface of the pressure-sensitive adhesive layer, a release film may be temporarily attached thereto and covered for the purpose of preventing the contamination until the layer is provided for practical use.

The thickness of the pressure-sensitive adhesive layer may usually be in a range of 5 μm to 100 μm. In another example, the thickness may be about 10 μm or more, 15 μm or more, or 20 μm or more, or may be about 90 μm or less, 80 μm or less, 70 μm or less, 60 μm or less, 50 μm or less, 40 μm or less, or 30 μm or less.

As the polarizing film, a polarizing film in which a light absorption axis is formed along one in-plane direction can be used. Such polarizing films are variously known. In one example, as the polarizing film, a poly(vinyl alcohol) (hereinafter, PVA)-based polarizing film, which is a typical linear absorption polarizing film, can be used. Such a polarizing film usually comprises a PVA film and an anisotropic absorbent material adsorbed and oriented on the PVA film. As the anisotropic absorbent material, various dichroic dyes may be used, and iodine-based materials may be typically used. Such a polarizing film is generally referred to as an iodine-based absorbent linear PVA polarizing film.

For example, the PVA-based polarizing plate may be produced by subjecting a PVA-based film to various treatments such as swelling, dyeing, cross-linking and stretching, followed by cleaning and drying processes. As described below, the polarizing film can adjust shrinkage force to a predetermined range, where the shrinkage force can be controlled by adjusting the process conditions in any of the processes. In general, the shrinkage force may be influenced by draw ratios or the like during the stretching process of the processes. That is, when the draw ratio is high, the shrinkage force may be high, and when the draw ratio is low, it may be low. However, this method corresponds to one exemplary method in which the shrinkage force can be controlled, and those skilled in the field of manufacturing the polarizing film can easily produce a polarizing film having a desired shrinkage force according to the purpose.

The polarizing film of the present application is the iodine-base absorption linear PVA polarizing film, which may comprise a PVA-based film and an anisotropic absorbent material adsorbed and oriented on the PVA-based film.

As the PVA-based film, for example, a general PVA-based film used in the conventional polarizing film may be used. A material of such a PVA-based film may include PVA or a derivative thereof. The derivative of PVA may include polyvinylformal or polyvinyl acetal, and the like, and may also include those modified by olefins such as ethylene or propylene, unsaturated carboxylic acids such as acrylic acid, methacrylic acid or crotonic acid and alkyl esters thereof or acrylamide, and the like. The PVA has a polymerization degree of about 100 to 10000 or so or about 1000 to 10000 or so, and a saponification degree of about 80 mol % to 100 mol % or so, but is not limited thereto.

The PVA-based film can also be exemplified by a hydrophilic polymer film such as a partially saponified film of ethylene-vinyl acetate copolymer series, a polyene-based oriented film such as a dehydrated product of PVA or a dehydrochlorinated product of polyvinyl chloride, and the like.

The PVA-based film may contain an additive such as a plasticizer or a surfactant. The plasticizer may be exemplified by polyol and a condensate thereof, and for example, may be exemplified by glycerin, diglycerin, triglycerin, ethylene glycol, propylene glycol or polyethylene glycol, and the like. When such a plasticizer is used, the ratio thereof is not particularly limited and may be generally approximately 20 wt % or less in the PVA-based film.

The kind of the anisotropic absorbent material that can be included in the polarizing film is also not particularly limited. In the present application, among the known anisotropic absorbent materials, those capable of satisfying the above-described optical characteristics can be appropriately selected. An example of the anisotropic absorbent material can be exemplified by iodine. The ratio of the anisotropic absorbent material in the polarizing film is also not particularly limited as long as it can satisfy the desired physical properties.

The polarizing film can be produced, for example, by performing at least dyeing, cross-linking and stretching processes on the PVA-based film.

In the dyeing process, an anisotropic absorbent material such as iodine can be adsorbed and/or oriented on the PVA-based film. Such a dyeing process can be performed together with the stretching process. The dyeing can generally be carried out by immersing the film in a solution containing an anisotropic absorbent material, for example, an iodine solution. As the iodine solution, for example, an aqueous solution in which iodine ions are contained by iodine and an iodinated compound as a solubilizing agent may be used. Here, as the iodinated compound, for example, potassium iodide, lithium iodide, sodium iodide, zinc iodide, aluminum iodide, lead iodide, copper iodide, barium iodide, calcium iodide, tin iodide or titanium iodide, and the like can be used. The concentrations of iodine and/or iodide ions in the iodine solution can be controlled within a conventional range according to the purpose. In the dyeing process, the temperature of the iodine solution is usually 20° C. to 50° C. or 25° C. to 40° C. or so, and the immersion time is usually 10 seconds to 300 seconds or 20 seconds to 240 seconds or so, without being limited thereto.

The cross-linking process carried out in the production procedure of the polarizing film can be carried out, for example, using a cross-linking agent such as a boron compound. The order of the cross-linking process is not particularly limited, and the process can be performed, for example, with the dyeing and/or stretching processes, or can proceed separately. The cross-linking process may also be carried out several times. As the boron compound, boric acid or borax may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the cross-linking degree and the heat resistance thereof. An iodinated compound such as potassium iodide can be contained in an aqueous solution of boric acid or the like.

The treatment temperature of the cross-linking process is usually in a range of 25° C. or higher, 30° C. to 85° C. or 30° C. to 60° C. or so, and the treatment time is usually 5 seconds to 800 seconds or 8 seconds to 500 seconds or so, without being limited thereto.

The stretching process is generally performed by uniaxial stretching. Such stretching may also be performed together with the dyeing and/or cross-linking processes. The stretching method is not particularly limited, and for example, a wet stretching method can be applied. In such a wet stretching method, for example, stretching after dyeing is generally carried out, but stretching may be carried out together with cross-linking, and may be carried out several times or in multiple stages.

The iodinated compound such as potassium iodide can be contained in the treatment liquid applied to the wet stretching method. In the stretching, the treatment temperature is usually in the range of 25° C. or higher, 30° C. to 85° C., or 50° C. to 70° C. or so, and the treatment time is usually 10 seconds to 800 seconds or 30 seconds to 500 seconds, without being limited thereto.

The total draw ratio in the stretching processes can be controlled in consideration of the orientation characteristics and the like, and the total draw ratio may be about 3 to 10 times, 4 to 8 times, or 5 to 7 times or so based on the original length of the PVA-based film, but is not limited thereto. Here, in the case of involving the stretching even in the swelling process or the like other than the stretching process, the total draw ratio may mean the cumulative draw ratio including the stretching in each process. Such a total draw ratio can be adjusted to an appropriate range in consideration of orientation, workability or stretching cut possibility of the polarizing film, and the like. The shrinkage force can be controlled by controlling the draw ratio, as described above.

In the production process of the polarizing film, in addition to the dyeing, cross-linking and stretching, the swelling process may also be performed before the processes are performed. It is possible to clean contamination of the PVA-based film surface, or an antiblocking agent by swelling, and there is also an effect capable of reducing unevenness such as dyeing deviation by the swelling.

In the swelling process, water, distilled water or pure water, and the like can be usually used. The main component of the relevant treatment liquid is water, and if necessary, a small amount of an iodinated compound such as potassium iodide or an additive such as a surfactant, or alcohol, and the like can be included therein.

The treatment temperature in the swelling process is usually 20° C. to 45° C. or so, or 20° C. to 40° C. or so, but is not limited thereto. Since the swelling deviations can cause dyeing deviations, the process variables can be adjusted so that the occurrence of such swelling deviations is suppressed as much as possible. If necessary, the proper stretching may also be performed in the swelling process.

The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small and can control so that the stretching failure of the film does not occur.

In the production process of the polarizing film, a metal ion treatment can be performed. Such a treatment is carried out, for example, by immersing the PVA-based film in an aqueous solution containing a metal salt. This allows metal ions to be contained in the polarizer, and in this process, the color tone of the PVA-based polarizing film can also be adjusted by controlling the kind or ratio of the metal ions. As the metal ion that can be applied, metal ions of transition metals such as cobalt, nickel, zinc, chromium, aluminum, copper, manganese or iron can be exemplified, and the color tone can also be adjusted by selecting a proper kind among them.

In the production procedure of the polarizing film, the cleaning process may proceed after dyeing, cross-linking and stretching. Such a cleaning process may be performed by a solution of iodine compound such as potassium iodide, and may also be performed by using water.

This cleaning with water may also be combined with cleaning with the solution of an iodinated compound, where a solution in which liquid alcohols such as methanol, ethanol, isopropyl alcohol, butanol or propanol are blended may also be used.

After passing through such a process, the polarizing film can be produced by performing a drying process. In the drying process, for example, it may be performed at an appropriate temperature for a suitable time in consideration of the moisture content and the like required for the polarizing film, and such conditions are not particularly limited.

The thickness of the polarizing film applied in the present application may usually be within a range of about 5 μm to 25 μm. In another example, the thickness may be about 24 μm or less, 23 μm or less, 22 μm or less, 21 μm or less, 20 μm or less, 19 μm or less, 18 μm or less, or 17 μm or less, or may be about 6 μm or more, 7 μm or more, 8 μm or more, 9 μm or more, 10 μm or more, 11 μm or more, 12 μm or more, 13 μm or more, 14 μm or more, 15 μm or more, or 16 μm or more or so.

The polarizing film may have shrinkage force in one in-plane direction within a range of about 0.1N to 15N. The one in-plane direction may be, for example, a direction in which the above-described light absorption axis is formed. The shrinkage force may be 14.5 N or less, 14 N or less, 13.5 N or less, 13 N or less, 12.5 N or less, 12 N or less, 11.5 N or less, 11 N or less, 10.5 N or less, 10 N or less, 10 N or less, 9.5 N or less, or 9 N or less, or may be 0.5 N or more, 1 N or more, 2 N or more, 3 N or more, 4 N or more, 5 N or more, 6 N or more, 7 N or more, or 8N or more.

The polarizing film having the shrinkage force as above can be applied by selecting the polarizing film having the shrinkage force among the available polarizing films or by controlling the process conditions such as the stretching conditions in the production procedure as described above. Usually, the polarizing film produced using the PVA-based film exhibits the shrinkage force in the above-mentioned range in the light absorption axis direction, and thus the polarizing film produced from the PVA-based film in the present application, that is, the PVA-based polarizing film can generally be used.

In the production method of the present application, the step of attaching the polarizing film as above and the optical film is performed.

In the production method of the present application, the attachment of the polarizing film and the optical film may be performed such that the ratio ($S_P/S_V$) of the shrinkage force ($S_P$) of the entire polarizing plate in the light absorption axis direction of the polarizing film to the shrinkage force ($S_V$) of the entire polarizing plate in the direction perpendicular to the light absorption axis direction is in the range of 0.7 to 1.5. In another example, the ratio ($S_P/S_V$) may be about 0.71 or more, about 0.72 or more, about 0.73 or more, about 0.74 or more, about 0.75 or more, about 0.76 or more, about 0.77 or more, about 0.78 or more, about 0.79 or more, about 0.8 or more, about 0.81 or more, about 0.82 or more, about 0.83 or more, about 0.84 or more, about 0.85 or more, about 0.86 or more, about 0.87 or more, about 0.88 or more, about 0.89 or more, about 0.9 or more, about 0.91 or more, about 0.92 or more, about 0.93 or more, about 0.94 or more, about 0.95 or more, about 0.96 or more, or about 0.97 or more, or may be about 1.49 or less, about 1.48 or less, about 1.47 or less, about 1.46 or less, about 1.45 or less, about 1.44 or less, about 1.43 or less, about 1.42 or less, about 1.41 or less, about 1.4 or less, about 1.39 or less, about 1.38 or less, about 1.37 or less, about 1.36 or less, about 1.35 or less, about 1.34 or less, about 1.33 or less, about 1.32 or less, about 1.31 or less, about 1.30 or less, about 1.29 or less, about 1.28 or less, about 1.27 or less, about 1.26 or less, about 1.25 or less, about 1.24 or less, about 1.23 or less, about 1.22 or less, about 1.21 about 1.2 or less, about 1.19 or less, about 1.18 or less, about 1.17 or less, about 1.16 or less, about 1.15 or less, about 1.14 or less, about 1.13 or less, about 1.12 or less, about 1.11 or less, about 1.1 or less, about 1.09 or less, about 1.08 or less, about 1.07 or less, or about 1.06 or less. By adjusting the ratio, a polarizing plate capable of preventing bending or twisting can be formed regardless of the desired polarizing plate, that is, the thickness and the light absorption axis direction and the size of the polarizing plate, and the like.

In the production method of the present application, the attachment of the polarizing film and the optical film may also be performed such that the shrinkage force of the entire polarizing plate in the direction parallel to the light absorption axis of the polarizing film is in the range of 6.5N to 15N. In another example, the shrinkage force may be about 6.6N or more, 6.7N or more, 6.8N or more, 6.9N or more, 7N or more, 7.1N or more, 7.2N or more, 7.3N or more, 7.4N or more, 7.5N or more, 7.6N or more, or 7.7N or more, or may be 14.9N or less, 14.8N or less, 14.7N or less, 14.6N or less, 14.5N or less, 14.4N or less, 14.3N or less, 14.2N or less, 14.1N or less, 14N or less, 13.9N or less, 13.8N or less, 13.7N or less, 13.6N or less, 13.5N or less, 13.4N or less, 13.3N or less, 13.2N or less, 13.1N or less, 13N or less, 12.9N or less, 12.8N or less, 12.7N or less, 12.6N or less, 12.5N or less, 12.4N or less, 12.3N or less, 12.2N or less, 12.1N or less, 12N or less, 11.9N or less, 11.8N or less, 11.7N or less, 11.6N or less, 11.5N or less, 11.4N or less, 11.3N or less, 11.2N or less, 11.1N or less, 11N or less, 10.9N or less, 10.8N or less, 10.7N or less, 10.6N or less, 10.5N or less, 10.4N or less, 10.3N or less, 10.2N or less, 10.1N or less, 10N or less, 9.9N or less, 9.8N or less, 9.7N or less, 9.6N or less, 9.5N or less, 9.4N or less, 9.3N or less, 9.2 N or less, 9.1N or less, 9N or less, 8.9N or less, 8.8N or less, 8.7N or less, 8.6N or less, 8.5N or less, 8.4N or less, 8.3N or less, 8.2N or less, or 8.1N or less. By adjusting the ratio, a polarizing plate capable of preventing bending or twisting can be formed regardless of the desired polarizing plate, that is, the thickness and the light absorption axis direction and the size of the polarizing plate, and the like.

The production method of the present application may also be performed such that the shrinkage force of the entire polarizing plate in the direction perpendicular to the light absorption axis of the polarizing film is in the range of 6N to 15N. In another example, the shrinkage force may be about 6.1N or more, about 6.2N or more, about 6.3N or more, about 6.4N or more, about 6.5N or more, 6.6N or more, 6.7N or more, 6.8N or more, 6.9N or more, 7N or more, 7.1N or more, or 7.2N or more, or may be 14.9N or less, 14.8N or less, 14.7N or less, 14.6N or less, 14.5N or less, 14.4N or less, 14.3N or less, 14.2N or less, 14.1N or less, 14N or less, 13.9N or less, 13.8N or less, 13.7N or less, 13.6N or less, 13.5N or less, 13.4N or less, 13.3N or less, 13.2N or less, 13.1N or less, 13N or less, 12.9N or less, 12.8N or less, 12.7N or less, 12.6N or less, 12.5N or less, 12.4N or less, 12.3N or less, 12.2N or less, 12.1N or less, 12N or less, 11.9N or less, 11.8N or less, 11.7N or less, 11.6N or less, 11.5N or less, 11.4N or less, 11.3N or less, 11.2N or less, 11.1N or less, 11N or less, 10.9N or less, 10.8N or less, 10.7N or less, 10.6N or less, 10.5N or less, 10.4N or less, 10.3N or less, 10.2N or less, 10.1N or less, 10N or less, 9.9N or less, 9.8N or less, 9.7N or less, 9.6N or less, 9.5N or less, 9.4N or less, 9.3N or less, 9.2N or less, 9.1N or less, 9N or less, 8.9N or less, 8.8N or less, 8.7N or less, 8.6N or less, 8.5N or less, 8.4N or less, 8.3N or less, 8.2N or less, or 8.1N or less. By adjusting the ratio, a polarizing plate capable of preventing bending or twisting can be formed regardless of the desired polarizing plate, that is, the thickness and the light absorption axis direction and the size of the polarizing plate, and the like.

In order to form such a polarizing plate, the attachment position may be controlled when the optical film and the polarizing film are attached. For example, the attachment may be performed such that the first direction of the polymer film, that is, the direction (for example, the TD direction of the polymer film) in which the shrinkage force after the heat-treatment is in the range of 5N to 10N and the light absorption axis of the polarizing film are perpendicular to each other.

Therefore, the ratio (S1/S2) of the shrinkage force (S1) of the polymer film, which is applied in the attachment process, in the first direction and the shrinkage force (S2) in the second direction perpendicular to the first direction (the ratio after the heat-treatment) may be 13 or more.

Specific details of the shrinkage force of the polymer film or the optical film in the first direction after the heat-treatment, the ratio (S1/S2) of shrinkage force, and other properties are as described above.

In view of the above-mentioned shrinkage force of the polarizing film in the light absorption axis direction, the ratio ($S_{Pro}/S_{PVA}$) of the shrinkage force ($S_{PVA}$) of the polarizing film in the in-plane direction parallel to the light absorption axis direction and the shrinkage force ($S_{Pro}$) of the optical film (polymer film) in the first direction by such an attachment process may be in the range of 0.1 to 5. In another example, the ratio may be about 0.15 or more, about 0.2 or more, about 0.25 or more, about 0.3 or more, about 0.35 or more, about 0.4 or more, about 0.45 or more, about 0.5 or more, about 0.55 or more, about 0.6 or more, or about 0.65 or more, or may be about 4.5 or less, about 4 or less, about 3.5 or less, about 3 or less, about 2.5 or less, about 2 or less, about 1.5 or less, about 1 or less, about 0.95 or less, about 0.9 or less, about 0.85 or less, about 0.8 or less, or about 0.75 or less or so.

Through the arrangement as above, the present application can provide a polarizing plate without any problem of durability, warpage or twisting, regardless of the thickness, the formation direction of the light absorption axis and the size of the polarizing plate.

For example, the production process of the polarizing plate may be performed such that the range of the A value according to Equation 1 below is in a range of 0.01 to 26 N·mm. That is, by adjusting the thicknesses of the optical film, the pressure-sensitive adhesive layer and/or the polarizing film or the thickness of each element included in the polarizing plate in addition to the above in consideration of the shrinkage force of the optical film and the polarizing film applied at the time of producing the polarizing plate, it is possible to satisfy Equation 1 below. The production process of the polarizing plate that satisfies Equation 1 may further comprising a process of forming a pressure-sensitive adhesive layer on the surface of the polarizing film on which the optical film is not attached.

$$A = a \, X(S_{PVA} \times (T_1+b) + S_{Pro} \times (T_2+b)) \qquad \text{[Equation 1]}$$

In Equation 1, $S_{PVA}$ is the shrinkage force of the polarizing film in the light absorption axis direction, $S_{Pro}$ is the large shrinkage force among the shrinkage force of the optical film in the direction parallel to the light absorption axis direction of the polarizing film and the shrinkage force of the optical film in the direction perpendicular to the light absorption direction, $T_1$ is the distance (unit: mm) from the lowermost portion of the pressure-sensitive adhesive layer to the center of the polarizing film, $T_2$ is the distance (unit: mm) from the lowermost portion of the pressure-sensitive adhesive layer to the center of the optical film, a is a number within a range of 0.5 to 2, and b is a number within a range of 0.14 to 0.6.

The A value in Equation 1 above reflects a bending property of the polarizing plate. If the polarizing plate has the A value, even when the polarizing plate is formed thin, it is possible to provide a display device having excellent durability and optical characteristics without causing warping or twisting upon having been applied to a display device such as an LCD or an OLED.

In another example, the A value in Equation 1 above may be 0.05 N·mm or more, 0.1 N·mm or more, 0.15 N·mm or more, 0.2 N·mm or more, 0.25 N·mm or more, 0.3 N·mm or more, 0.4 N·mm or more, 0.45 N·mm or more, 0.5 N·mm or more, 0.55 N·mm or more, 0.6 N·mm or more, 0.65 N·mm or more, 0.7 N·mm or more, 0.75 N·mm or more, 0.8 N·mm or more, 0.85 N·mm or more, 0.9 N·mm or more, 0.95 N·mm or more, 0.1 N·mm or more, 0.5 N·mm or more, 1 N·mm or more, 1.5 N·mm or more, 2 N·mm or more, 2.5 N·mm or more, 3 N·mm or more, 3.5 N·mm or more, 4 N·mm or more, 4.5 N·mm or more, 5 N·mm or more, 5.5 N·mm or more, 6 N·mm or more, 6.5 N·mm or more, 7 N·mm or more, 7.5 N·mm or more, 8 N·mm or more, 8.5 N·mm or more, 9 N·mm or more, 9.5 N·mm or more, 10 N·mm or more, 11 N·mm or more, 12 N·mm or more, 13 N·mm or more, 14 N·mm or more, 15 N·mm or more, 16 N·mm or more, 17 N·mm or more, 18 N·mm or more, 19 N·mm or more, or 20 N·mm or more or so, or may be 25 N·mm or less, 24 N·mm or less, 23 N·mm or less, 22 N·mm or less, 21 N·mm or less, 20 N·mm or less, 19 N·mm or less, 18 N·mm or less, 17 N·mm or less, 16 N·mm or less, 15 N·mm or less, 14 N·mm or less, 13 N·mm or less, 12 N·mm or less, 11 N·mm or less, 10 N·mm or less, 9 N·mm or less, 8 N·mm or less, 7 N·mm or less, 6 N·mm or less, or 5 N·mm or less.

The A value may fall within the above-described numerical range in the entire range of a and/or b, as defined above, or may also fall within the above-described numerical range when any one value within the range of a and any one value within the range of b have been substituted.

In Equation 1 above, the a value may be a number in a range of 0.5 to 2. In another example, the a value may be about 0.55 or more, about 0.6 or more, about 0.65 or more, about 0.7 or more, about 0.75 or more, about 0.8 or more, about 0.85 or more, about 0.9 or more, about 1 or more, or about 1.5 or more, or may also be 1.9 or less, about 1.8 or less, about 1.7 or less, about 1.6 or less, about 1.5 or less, about 1.4 or less, about 1.3 or less, about 1.2 or less, about 1.1 or less, about 1.0 or less, about 0.95 or less, about 0.9 or less, about 0.85 or less, about 0.8 or less, about 0.75 or less, about 0.7 or less, or about 0.65 or less.

In Equation 1 above, the b value may be a number in a range of 0.14 to 0.6. In another example, the b value to be substituted in Equation 1 above may be 0.15 or more, or 0.2 or more, or may be 0.55 or less, 0.5 or less, 0.45 or less, 0.4 or less, 0.35 or less, or 0.3 or less. In one example, when the polarizing plate is applied to an LCD, the b value may be determined according to the thickness of the LCD panel, and for example, a half of the thickness (unit: mm) of the LCD panel may be the b value.

For example, in the method for producing the polarizing plate, the attachment of the optical film and the polarizing film may be performed using a known adhesive. Therefore, in the polarizing plate, an adhesive layer may be further included between the optical film and the polarizing film.

As the adhesive, for example, an adhesive layer used for attaching a polarizing film and an optical film in a conventional polarizing plate can be used.

The adhesive layer may comprise one or two or more of, for example, a polyvinyl alcohol-based adhesive; an acrylic adhesive; a vinyl acetate-based adhesive; a urethane-based adhesive; a polyester-based adhesive; a polyolefin-based adhesive; a polyvinyl alkyl ether-based adhesive; a rubber-based adhesive; a vinyl chloride-vinyl acetate-based adhesive; a styrene-butadiene-styrene (SBS) adhesive; a styrene-butadiene-styrene hydrogen adduct (SEBS)-based adhesive; an ethylenic adhesive; and an acrylic ester-based adhesive, and the like. Such an adhesive may be formed using, for example, an aqueous, solvent-based or solventless adhesive composition. In addition, the adhesive composition may be a thermosetting type, room temperature curing type, moisture curing type, active energy ray curing type or hybrid curing type adhesive composition.

The manner of attaching a polarizing film and an optical film using such an adhesive is not particularly limited, and a manner of applying the adhesive composition to the polarizing film or the optical film, laminating the polarizing film and the optical film, and curing the same, or a droplet manner can be used.

The thickness of such an adhesive layer can be, for example, in a range of about 1 μm to 5 μm or about 2 μm to 4 μm.

The polarizing plate of the present application as above may comprise other necessary constitutions in addition to the above-described elements.

As a further constitution, the polarizing plate may further comprise a cured resin layer or other types of protective films of the polarizing film between the polarizing film and the pressure-sensitive adhesive layer. Although the cured resin layer is more advantageous than the protective film for forming a thinner polarizing plate, the protective film may also be applied. Such a cured resin layer is also generally called a hard coating layer, and is generally applied instead of omitting any one of optical films in a polarizing plate. The kind of the cured resin layer that can be applied in the present application is not particularly limited, and various types of cured resin layers used for providing the thin polarizing plate can be applied. Usually, such a cured resin layer may comprise an epoxy resin, an oxetane resin, a urethane resin and/or an acrylic resin, and the like, and such a resin layer is variously known.

The thickness of this cured resin layer can be, for example, in a range of about 4 μm to 10 μm or about 4.5 μm to 10 μm.

The kind of protective film is also not particularly limited, which may be appropriately selected from known materials.

As described above, the polarizing plate of the present application may also further comprise one or more functional layers selected from the group consisting of other known constitutions, for example, a retardation plate, a wide viewing angle compensation film, and/or a brightness enhancing film, and thus, the production method may also comprise a step of forming such functional layers in the required positions.

The polarizing plate may be configured in various forms according to the application to be applied, for example, the type of the applied display device or the mode of the relevant device.

For example, the small angle of the angles formed by one side of the polarizing film in the polarizing plate and the light absorption axis of the polarizing film may be in a range of 0 degrees to 10 degrees or in a range of 80 degrees to 100 degrees. In another example, the angle may be 9 degrees or less, 8 degrees or less, 7 degrees or less, 6 degrees or less, 5 degrees or less, 4 degrees or less, 3 degrees or less, 2 degrees or less, or 1 degree or less. Furthermore, in another example, the angle may be about 81 degrees or more, 82 degrees or more, 83 degrees or more, 84 degrees or more, 85 degrees or more, 86 degrees or more, 87 degrees or more, 88 degrees or more, 89 degrees or more, or 90 degrees or more, or may also be 99 degrees or less, 98 degrees or less, 97 degrees or less, 96 degrees or less, 95 degrees or less, 94 degrees or less, 93 degrees or less, 92 degrees or less, 91 degrees or less, or about 90 degrees or less or so.

In another example, the small angle of the angles formed by one side of the polarizing film in the polarizing plate and the light absorption axis of the polarizing film may be in the range of 35 degrees to 55 degrees or in the range of 125 degrees to 145 degrees.

In another example, the angle may be about 36 degrees or more or so, 37 degrees or more or so, 38 degrees or more or so, 39 degrees or more or so, 40 degrees or more or so, 41 degrees or more or so, 42 degrees or more or so, 43 degrees or more or so, 44 degrees or more or so, or 45 degrees or more or so, or may be 54 degrees or less or so, 53 degrees or less or so, 52 degrees or less or so, 51 degrees or less or so, 50 degrees or less or so, 49 degrees or less or so, 48 degrees or less or so, 47 degrees or less or so, 46 degrees or less or so, or 45 degrees or less or so, and furthermore, may be about 126 degrees or more or so, 127 degrees or more or so, 128 degrees or more or so, 129 degrees or more or so, 130 degrees or more or so, 131 degrees or more or so, 132 degrees or more or so, 133 degrees or more or so, 134 degrees or more or so, or 135 degrees or more or so, or may be 144 degrees or less or so, 143 degrees or less, 142 degrees or less or so, 141 degrees or less or so, 140 degrees or less or so, 139 degrees or less or so, 138 degrees or less or so, 137 degrees or less or so, 136 degrees or less or so, or 135 degrees or less or so.

Usually, the polarizing film and the polarizing plate may have a quadrangle, and one side of the polarizing film or the polarizing plate forming the angle with the light absorption axis may be any one side of the quadrangle. For example, if the quadrangle is a rectangle, the one side may be a long side or a short side of the rectangle.

In the case of the present application, a polarizing plate having proper performance may be provided regardless of how the light absorption axis is formed depending on the application of the polarizing plate.

The present application also relates to a display device, and for example, relates to an LCD or OLED. The display device such as the LCD or the OLED may comprise the polarizing plate of the present application. The display device may comprise, for example, a display panel such as an LCD panel or an OLED panel and the polarizing plate of the present application attached to the display panel.

The type of the display panel applicable to the display device of the present application or the position of the polarizing plate attached to the panel, and the like is not particularly limited. That is, the display panel can be realized in various known manners as long as the polarizing plate of the present application is applied.

Advantageous Effects

The present application can provide an optical film satisfying optical and mechanical durability required in a polarizing plate effectively and capable of forming a polarizing plate without causing bending when applied to a display device, and a method for producing a polarizing plate to which the optical film is applied. The present application can provide an optical film capable of realizing the required optical and mechanical durability without causing bending even in a polarizing plate applied to a thin display device and/or a thin polarizing plate, and a method for producing a polarizing plate to which the optical film is applied.

MODE FOR INVENTION

Hereinafter, the present application will be described in detail through Examples, but the scope of the present application is not limited by the following Examples.

The term MD referred to herein means the machine direction of the stretched film unless otherwise specified, and the TD means the transverse direction of the stretched film unless otherwise specified.

1. Measurement of Shrinkage Force

The shrinkage force of the polarizing film, the optical film, the polymer film or the polarizing plate mentioned herein was measured by the following method using a DMA instrument from TA. A specimen was produced to have a width of about 5.3 mm and a length of about 15 mm, and both ends of the specimen in the longitudinal direction were fixed to the clamp of the measuring instrument and then the contractile force was measured. Here, the length 15 mm of the specimen is the length excluding the portion to be fixed to the clamp. After fixing the specimen to the clamp as above, the specimen was pulled and fixed to maintain strain 0.1% in the state of preload 0N, and then the shrinkage force applied when the strain 0.1% was kept at the elevated temperature of the following temperature condition was measured. As the results of the shrinkage force, values were measured 120 minutes after 80° C. stabilization of the following temperature condition. The shrinkage force was measured at relative humidity maintained at approximately 48% or so.

<Measurement Temperature Condition and Time>
Temperature: 25° C. start→75° C. after 3 minutes→80° C. stabilization (no acceleration condition) after 7 minutes
Measurement time: 120 minutes Production Example 1. Production of PVA-Based Polarizing Film (A)

After a PVA (poly(vinyl alcohol)) film (Nippon Synthetic Chemical Co., Ltd., polymerization degree of about 3,000 or so) with a thickness of about 45 μm or so used in manufacturing a polarizing film was swelled in a pure solution at a temperature ranging from about 20° C. to 30° C., a dyeing process was performed for about 10 seconds to 30 seconds or so in an iodine solution at a temperature of 30° C. to 40° C. or so. Thereafter, a cleaning process was performed for about 20 seconds with a boric acid solution (concentration: about 2 wt %) at a temperature of about 40° C. or so, and then the film was stretched about 6 times in a boric acid solution at a temperature of 50° C. to 60° C. and a concentration of about 4.0 wt %, and after stretching, a complementary color process was performed in a KI solution at a concentration of about 2 to 4 wt % and dried to produce a polarizing film having a thickness of about 17 μm. As a result of measuring the shrinkage force (hereinafter, MD shrinkage force) of the manufactured PVA-based polarizing film in the light absorption axis direction, it was approximately 8 to 10 N or so.

Example 1

Heat Treatment of Polymer Film

For a PET (polyethylene terephthalate) polymer film (SRF film, thickness: 80 μm, manufacturer: Toyobo, product name: TA055, glass transition temperature: 80° C., shrinkage force in TD direction before heat-treatment: about 7.53 N, shrinkage direction in MD direction: in a range of about 0.1 to 0.5N), heat-treatment was performed in the following manner. First, a flattening process was performed by exposing the SRF film to steam having a temperature of approximately 80° C. to 100° C. or so for a time (about 20 seconds to 60 seconds) to improve flatness. Subsequently, an antiglare layer (AG layer) as an optical layer was formed on one side of the SRF film. The antiglare layer was formed by using a curable composition, in which organic particles (manufacturer: Sekisui, average diameter: 2 μm) having a refractive index in a level of about 1.555 (reference wavelength: 550 nm) and a hydroxyl group on the surface were mixed to a urethane acrylate binder (Kyoeisha, PE3A) in a weight ratio of 20:1 (urethane acrylate binder:organic particles). The binder was crosslinked and polymerized by coating the curable composition on one side of the SRF film and irradiating it with ultraviolet rays in a light quantity of 150 mJ/cm$^2$, thereby forming an optical layer, where the antiglare layer thus formed had a thickness of approximately 4 μm or so.

Subsequently, the SRF film on which the optical layer was formed was maintained at a temperature of approximately 40° C. or so for 30 seconds to 90 seconds to perform heat-treatment. After the heat-treatment process, the shrinkage force of the SRF film in the TD (transverse direction) direction was about 7.18N or so, and the shrinkage force in the MD direction was in a level of about 0.2 to 0.35N or so.

Manufacture of Polarizing Plate

The heat-treated SRF film was applied as a protective film to produce a polarizing plate in the following manner. First, the SRF film was attached to one side of the PVA polarizing film (MD shrinkage: 8 to 10 N, thickness: 17 μm) produced in Production Example 1 using an epoxy-based ultraviolet curable adhesive (thickness: 2 μm to 3 μm). Upon the attachment, they were attached such that the TD (transverse direction) direction of the SRF film and the MD direction (absorption axis direction) of the PVA polarizing film were approximately perpendicular to each other, where the surface on which the optical layer was not formed was attached to the PVA polarizing film. Subsequently, an epoxy-based hard coating layer was formed to a thickness of about 5 to 7 μm or so on the surface of the PVA polarizing film to which the SRF film was not attached. Thereafter, an acrylic pressure-sensitive adhesive layer having a thickness of about 25 μm was formed on the lower part of the hard coating layer to produce a polarizing plate. The shrinkage force of the entire polarizing plate as manufactured above along the MD direction of the polarizing film was approximately 8N, and the shrinkage force along the TD direction of the polarizing film was approximately 9.5N or so. As a result of obtaining the A value of Equation 1 above on the manufactured polarizing plate, it was approximately 3.94 Nmm to 6.41 Nmm or so. The lower limit of the A value range was obtained by applying 0.78 as a, applying 0.25 mm (=applied LCD panel thickness (mm)/2) as b, applying about 9 N as $S_{PVA}$, applying 7.18N as $S_{Pro}$, applying 0.0395 mm (=pressure-sensitive adhesive thickness (25 μm)+hard coating layer thickness (6 μm)+polarizing film thickness (17 μm)/2) as T1, and applying 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2, in Equation 1. In addition, the upper limit of the A value range was obtained by applying 1.27 as a, applying 0.25 mm (=applied LCD panel thickness (mm)/2) as b, applying about 9 N as $S_{PVA}$, applying 7.18N as $S_{Pro}$, applying 0.0395 mm (=pressure-sensitive adhesive thickness (25 μm)+hard coating layer thickness (6 μm)+polarizing film thickness (17 μm)/2) as T1, and applying 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2, in Equation 1.

Example 2

Heat treatment was performed by maintaining the SRF film subjected to the steam treatment and the optical layer formation treatment in the same manner as in Example 1 at a temperature of approximately 60° C. or so for 30 seconds to 90 seconds. After the heat-treatment process, the shrinkage force of the SRF film in the TD (transverse direction) direction was about 6.86N or so, and the shrinkage force in the MD direction was in a level of about 0.2 to 0.35N or so. The polarizing plate was produced in the same manner as in Example 1 using the SRF film. The shrinkage force of the produced polarizing plate along the MD direction of the polarizing film was approximately 8N, and the shrinkage force along the TD direction of the polarizing film was approximately 8.18N or so. As a result of obtaining the A value of Equation 1 above on the manufactured polarizing plate, it was approximately 4.25 Nmm to 5.78 Nmm or so. The lower limit of the A value range was obtained by applying 0.86 as a, applying 0.25 mm (=applied LCD panel thickness (mm)/2) as b, applying about 9 N as $S_{PVA}$, applying 6.86N as $S_{Pro}$, applying 0.0395 mm (=pressure-sensitive adhesive thickness (25 μm)+hard coating layer thickness (6 μm)+polarizing film thickness (17 μm)/2) as T1, and applying 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2, in Equation 1. In addition, the upper limit of the A value range was obtained by applying 1.17 as a, applying 0.25 mm (=applied LCD panel thickness (mm)/2) as b, applying about 9 N as $S_{PVA}$, applying 6.86N as $S_{Pro}$, applying 0.0395 mm (=pressure-sensitive adhesive thickness (25 μm)+hard coating layer thickness (6 μm)+polarizing film thickness (17 μm)/2) as T1, and applying 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2, in Equation 1.

Example 3

Heat treatment was performed by maintaining the SRF film subjected to the steam treatment and the optical layer formation treatment in the same manner as in Example 1 at a temperature of approximately 80° C. for about 30 seconds to 90 seconds. After the heat-treatment process, the shrinkage force of the SRF film in the TD (transverse direction) direction was about 6.08N or so, and the shrinkage force in the MD direction was in a level of about 0.2 to 0.35N or so. The polarizing plate was produced in the same manner as in Example 1 using the SRF film. The shrinkage force of the produced polarizing plate along the MD direction of the polarizing film was approximately 8N, and the shrinkage force along the TD direction of the polarizing film was approximately 7.28N or so.

As a result of obtaining the A value of Equation 1 above on the manufactured polarizing plate, it was approximately 3 Nmm to 7.25 Nmm or so. The lower limit of the A value range was obtained by applying 0.64 as a, applying 0.25 mm (=applied LCD panel thickness (mm)/2) as b, applying about 9 N as $S_{PVA}$, applying 6.08N as $S_{Pro}$, applying 0.0395 mm (=pressure-sensitive adhesive thickness (25 μm)+hard coating layer thickness (6 μm)+polarizing film thickness (17 μm)/2) as T1, and applying 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2, in Equation 1. In addition, the upper limit of the A value range was obtained by applying 1.55 as a, applying 0.25 mm (=applied LCD panel thickness (mm)/2) as b, applying about 9 N as $S_{PVA}$, applying 6.08N as $S_{Pro}$, applying 0.0395 mm (=pressure-sensitive adhesive thickness (25 μm)+hard coating layer thickness (6 μm)+polarizing film thickness (17 μm)/2) as T1, and applying 0.0905 mm (=pressure-sensitive adhesive thickness (25 μm)+hard coating layer thickness (6 μm)+polarizing film thickness (17 μm)+adhesive layer thickness (2.5 μm)+protective film thickness (80 μm)/2) as T2, in Equation 1.

Bending Characteristic Evaluation

The polarizing plates manufactured in Examples were each attached to the upper and lower surfaces of a general 32-inch LCD (liquid crystal display) panel (thickness: about 500 μm) through the pressure-sensitive adhesive layers of the polarizing plates, respectively. Subsequently, the flatness (initial flatness) of the LCD panel was measured. Thereafter, the panel was put into a chamber at a temperature of 60° C. for 72 hours, and then taken out, and the panel variations after 2 hours and 24 hours were measured and summarized in Table 1 below. In Table 1 below, the term flatness is a difference between a portion that is bent most toward the upper polarizing plate and a portion that is bent most toward the lower polarizing plate in the liquid crystal panel, where this flatness can be confirmed using a known three-dimensional measuring instrument (Dukin Co., Ltd.).

TABLE 1

|  | Initial | After 2 hours | | After 6 hours | |
| --- | --- | --- | --- | --- | --- |
|  | Flatness | Flatness | Variation | Flatness | Variation |
| Example 1 | 2.2 | 2 | −0.2 | 1.8 | −0.4 |
| Example 2 | 2.5 | 1.9 | −0.6 | 1.6 | −0.9 |
| Example 3 | 1.7 | 1.6 | −0.1 | 1.4 | −0.3 |

The invention claimed is:

1. A method for producing an optical film, comprising:
treating a polymer film with steam, of which a temperature is from 50° C. to 150° C., for from 10 seconds to 1 hour before a heat-treatment,
forming an optical layer on a surface of the polymer film after the steam treatment,
subjecting the polymer film, on the surface of which the optical layer is formed, to a heat-treatment to adjust an asymmetry property of the polymer film,
wherein the heat-treatment is performed for from 10 seconds to 1,000 seconds,
wherein a shrinkage force of the polymer film before the heat-treatment along a first direction is from 5.5N to 15N,
wherein a ratio (S1/S2) of the shrinkage force (S1) of the polymer film before the heat-treatment along the first direction relative to a shrinkage force (S2) of the polymer film before the heat-treatment along a second direction perpendicular to the first direction is 10 or more,
wherein the heat-treatment is performed at a temperature satisfying Equation 2 below $$(Tg-60° \text{ °C.}) \leq T \leq (Tg+50° \text{ °C.}) \quad \text{[Equation 2]}$$

wherein, Tg is a glass transition temperature of the polymer film, T is a temperature of the heat-treatment, and each of units of the glass transition temperature and the temperature of the heat-treatment is ° C.

2. The method for producing an optical film according to claim 1, wherein the optical layer comprises a hard-coating layer, an antireflection layer, an antiglare layer or an antistatic layer.

3. The method for producing an optical film according to claim 1,
wherein, in the step of treating a polymer film with steam, positioning the polymer film on a flat surface, or positioning the polymer film in a direction parallel to a gravity direction, or positioning the polymer film at another position where a flatness may be secured and then exposing all or part of the polymer film to steam.

4. The method for producing an optical film according to claim 1, wherein the shrinkage force (S2) of the polymer film before the heat-treatment along a second direction perpendicular to the first direction is from 0.01N to 2N.

5. The method for producing an optical film according to claim 1, wherein the heat treatment is performed to adjust the asymmetry property of the polymer film, so that a ratio (SB/SA) of a shrinkage force (SB) of the polymer film before the heat-treatment along the first direction relative to a shrinkage force (SA) of the polymer film after the heat-treatment along the first direction is more than 1.

6. The method for producing an optical film according to claim 1, wherein the heat treatment is performed to adjust the asymmetry property of the polymer film, so that a shrinkage force of the polymer film after the heat-treatment along a first direction is from 5N to 10N.

7. The method for producing an optical film according to claim 6, wherein the heat treatment is performed to adjust the asymmetry property of the polymer film, so that a ratio (S1/S2) of the shrinkage force (S1) of the polymer film after the heat-treatment along the first direction relative to a shrinkage force (S2) of the polymer film after the heat-treatment along a second direction perpendicular to the first direction is 13 or more.

8. A method for producing a polarizing plate, comprising:
producing the optical film according to the method of claim 1;
attaching the optical film and a polarizing film having a light absorption axis formed in one in-plane direction.

9. The method for producing a polarizing plate according to claim 8, wherein the optical film is attached to the polarizing film so that a ratio ($S_P/S_V$) of a shrinkage force ($S_P$) of the polarizing plate along the light absorption axis of the polarizing film relative to a shrinkage force ($S_V$) of the polarizing plate along a direction perpendicular to the light absorption axis direction is from 0.7 to 1.5.

10. The method for producing a polarizing plate according to claim 8, wherein the optical film is attached to the polarizing film so that a shrinkage force of the polarizing plate along a direction parallel to the light absorption axis of the polarizing film is from 6.5N to 15N.

11. The method for producing a polarizing plate according to claim 8, wherein the optical film is attached to the polarizing film so that a shrinkage force of the polarizing plate along a direction perpendicular to the light absorption axis is from 6.0N to 15N.

12. The method for producing a polarizing plate according to claim 8, wherein a shrinkage force of the optical film along a first direction of the polymer film is from 5N to 10N and wherein the polarizing film and the optical film are attached so that the first direction and the light absorption axis of the polarizing film are perpendicular to each other.

13. The method for producing a polarizing plate according to claim 12, wherein a ratio (S1/S2) of a shrinkage force (S1) along a first direction of the polymer film relative to a shrinkage force (S2) along a second direction perpendicular to the first direction is 13 or more.

14. The method for producing a polarizing plate according to claim 8, wherein a shrinkage force of the polarizing film along a direction parallel to the light absorption axis is from 0.1 to 15N.

15. The method for producing a polarizing plate according to claim 8, wherein the smallest angle among angles formed by one side of the polarizing film and the light absorption axis of the polarizing film is from 0 to 10 degrees or from 80 to 100 degrees.

16. The method for producing a polarizing plate according to claim 8, wherein the smallest angle among angles formed by one side of the polarizing film and the light absorption axis of the polarizing film is from 35 to 55 degrees or from of 125 to 145 degrees.

* * * * *